(12) United States Patent
Ekvall et al.

(10) Patent No.: US 8,239,156 B2
(45) Date of Patent: Aug. 7, 2012

(54) METHOD FOR CALIBRATING SENSORS

(75) Inventors: Andreas Ekvall, Hallstahammar (SE); Bo Vigholm, Stora Sundby (SE)

(73) Assignee: Volvo Construction Equipment AB, Eskilstuna (SE)

(*) Notice: Subject to any disclaimer, the term of this patent is extended or adjusted under 35 U.S.C. 154(b) by 258 days.

(21) Appl. No.: 12/741,416

(22) PCT Filed: Nov. 21, 2007

(86) PCT No.: PCT/SE2007/001029
§ 371 (c)(1),
(2), (4) Date: May 5, 2010

(87) PCT Pub. No.: WO2009/067051
PCT Pub. Date: May 28, 2009

(65) Prior Publication Data
US 2011/0093229 A1 Apr. 21, 2011

(51) Int. Cl.
*G01L 27/00* (2006.01)
(52) U.S. Cl. ........................ 702/98
(58) Field of Classification Search .............. 702/98, 702/85; 73/1.01, 1.57
See application file for complete search history.

(56) References Cited

U.S. PATENT DOCUMENTS

| 6,257,050 B1 * | 7/2001 | Nagano et al. ............ 73/47 |
| 2003/0139860 A1 | 7/2003 | McBrien et al. |
| 2003/0216879 A1 | 11/2003 | Hashemian et al. |
| 2005/0199051 A1 | 9/2005 | Friedrich et al. |

FOREIGN PATENT DOCUMENTS

| DE | 19506388 C1 | 8/1996 |
| EP | 1734342 A1 | 12/2006 |
| JP | 10227655 A | 8/1998 |

OTHER PUBLICATIONS

International Search Report for corresponding International Application PCT/SE2007/001029.
International Search Report for correspondig International Application PCT/SE2007/001029.
International Preliminary Report on Patentability for corresponding International Application PCT/SE2007/001029.

* cited by examiner

*Primary Examiner* — Bryan Bui
(74) *Attorney, Agent, or Firm* — WRB-IP LLP

(57) ABSTRACT

A method for calibrating sensors in a system including a plurality of sensors which are arranged so that they can be subjected to the same load includes the steps of detecting the level of an operating parameter for a certain load level individually by at least two of the sensors, calculating a mean value of the operating parameter for the sensors for the load level, determining a deviation from the mean value for each of the sensors, and saving the value of the deviations for use in operation of the system.

16 Claims, 3 Drawing Sheets

METHOD FOR CALIBRATING SENSORS

BACKGROUND AND SUMMARY

The present invention relates to a method for calibrating sensors in a system comprising a plurality of sensors, which are arranged so that they can be subjected to the same load. In particular, the invention relates to calibration of a plurality of sensors of the same type, such as pressure sensors in a hydraulic system for a working machine.

Below, the invention will be described in connection with a working machine in the form of a wheel loader. This is a preferred, but by no means limiting application of the invention. The invention can for example also be used for other types of working machines (or work vehicles), such as a dumper, a backhoe loader, an excavator, or an agricultural machine such as a tractor.

In systems with many sensors, the relative values are often of interest, for example in case of drops in pressure or differences in temperature. However, the scattering between the sensors makes small differences difficult or impossible to measure, and it is difficult to achieve high measurement accuracy.

High measurement accuracy can be achieved by using sensors with narrow tolerances, alternatively by calibrating each sensor separately in production. Sensors with higher accuracy will result in a higher cost. Calibrating sensors separately in production takes time and will therefore also become expensive. Furthermore, the sensors drift over time, which is the reason why a continuous calibration is desirable.

It is desirable to achieve a method for calibrating sensors in a system which provides high accuracy during operation of the system, in a cost efficient way.

A method according to an aspect of the present invention comprises the steps of detecting the level of an operating parameter for a certain load level individually by means of at least two of said sensors, calculating a mean value of the operating parameter for said sensors for said load level, determining a deviation from the mean value for each of the sensors, and saving the value of the deviations for use in operation of the system.

Statistically, the calculated mean value has to be seen as the best value of a certain load level and is therefore used as a basis for the deviation (offset) at this load level. In this way, a higher accuracy can be obtained than the individual sensors can provide. The more sensors which are used for the mean value determination, the higher the accuracy becomes. A higher accuracy creates prerequisites for a better control during operation, which results in lower losses and thereby lower fuel consumption. Furthermore, prerequisites are created for a lower cost of the components in the system and a shorter lead time in production.

Preferably, the calibration is repeated continuously. Thereby, also a function check is obtained at each calibration.

A preferred application of the invention is a hydraulic system for operation of actuators (in the form of hydraulic cylinders) in a working machine for different functions. This system comprises, for example, pressure sensors for detecting a load pressure of each of the hydraulic cylinders and pressure sensors for detecting a pressure related to the output pump pressure.

Accordingly, in a hydraulic system where all, or a majority of the sensors can be pressurized with the same pressure, a mean value for all sensors which can be pressurized is calculated.

The hydraulic system is preferably load sensing. This means that the pump detects the pressure (a LS signal) from the activated hydraulic cylinders during operation of the system. The pressure signal then originates from said pressure sensors. The pump then sets a pressure which is a certain number of bar higher than the cylinder pressures. This brings about an oil flow out to the cylinders, the level of which depends upon how much the activated control valve is adjusted.

According to a preferred example, the method comprises the step of loading the sensors at a plurality of determined levels, saving the deviation values for each of the sensors for each of said load levels, and interpolating values for the deviation for the respective sensors within the range between said levels. In this way, a high accuracy can be obtained over the entire operating range in an efficient way. For example, linear interpolation between the different offset values can be utilized when calculating the useful sensor value.

According to another preferred example, the method comprises repeating the operating parameter detection several times and determining the mean value for each load as an average of the mean values from said repeated times. By means of performing the calibration continuously, possible drift over time can be handled. Furthermore, continuous calibration gives a higher quality (less individual scattering) of the system.

Further preferred embodiments of the invention and advantages associated therewith are apparent from the following description.

BRIEF DESCRIPTION OF FIGURES

The invention will be described more closely in the following, with reference to the embodiments shown in the attached drawings, wherein.

DETAILED DESCRIPTION

Figure 1:
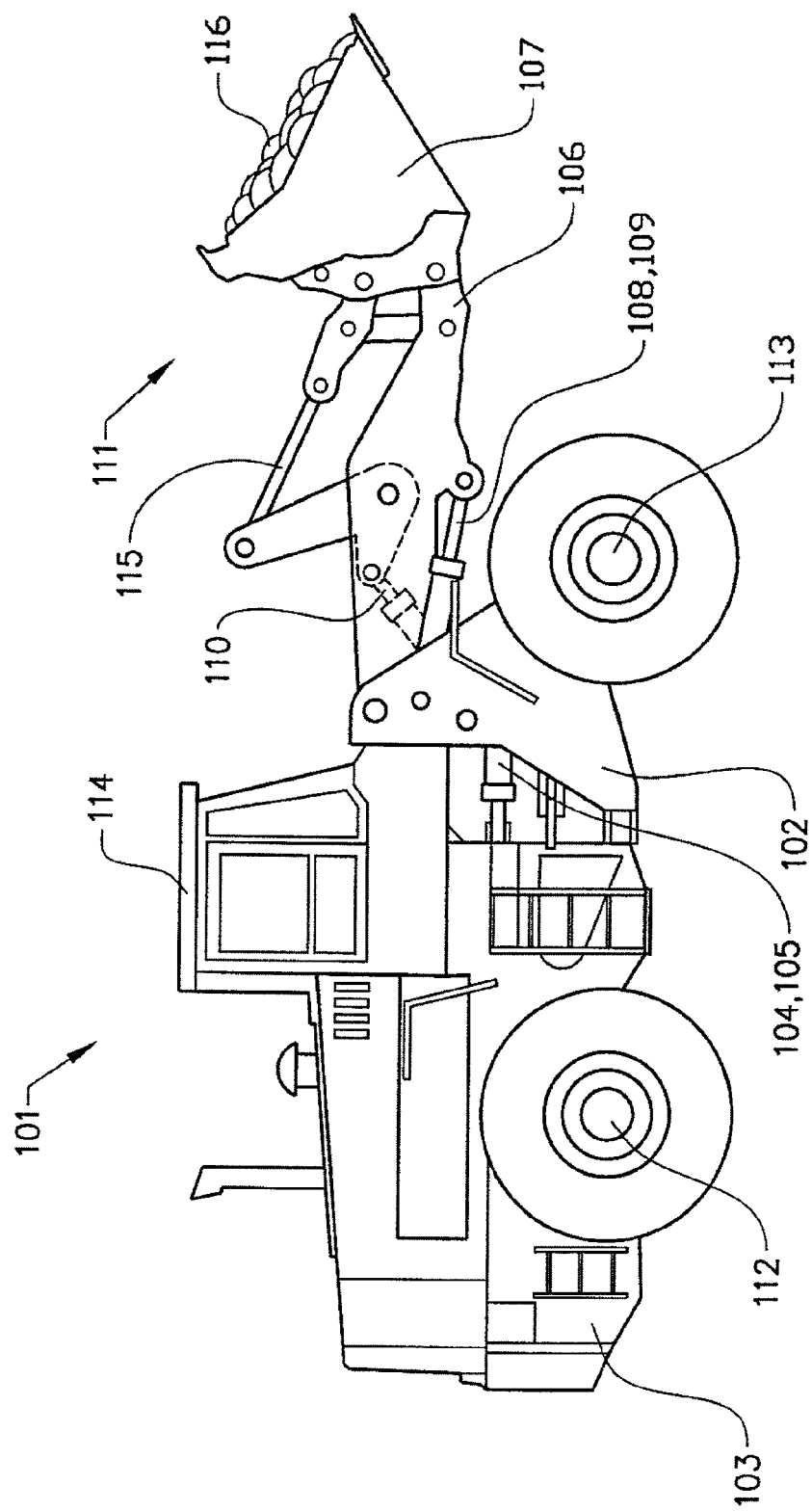
FIG. 1 shows a side view of a wheel loader.

FIG. 1 shows a side view of a wheel loader 101. The wheel loader 101 comprises a front vehicle section 102 and a rear vehicle section 103, said sections each comprising a frame and a pair of drive shafts 112, 113. The rear vehicle section 103 comprises an operator's cab 114. The vehicle sections 102, 103 are connected to each other in such a way that they can be pivoted relative to each other about a vertical axis by means of two hydraulic cylinders 104, 105 which are connected to the two sections. Accordingly, the hydraulic cylinders 104, 105 are disposed on different sides of a centre line in the longitudinal direction of the vehicle for steering, or turning the wheel loader 101.

The wheel loader 101 comprises an equipment 111 for handling objects or material. The equipment 111 comprises a load-arm unit 106 and an implement 107 in the form of a bucket which is fitted on the load-arm unit. Here, the bucket 107 is filled with material 116. A first end of the load-arm unit 106 is pivotally connected to the front vehicle section 102 in order to achieve a lifting movement of the bucket. The bucket 107 is pivotally connected to a second end of the load-arm unit 106 in order to achieve a tilting movement of the bucket.

The load-arm unit 106 can be raised and lowered relative to the front section 102 of the vehicle by means of two hydraulic cylinders 108, 109, each of which is connected at one end to the front vehicle section 102 and at the other end to the load-arm unit 106. The bucket 107 can be tilted relative to the load-arm unit 106 by means of a third hydraulic cylinder 110, which is connected at one end to the front vehicle section 102 and at the other end to the bucket 107 via a link arm system.

Figure 2:
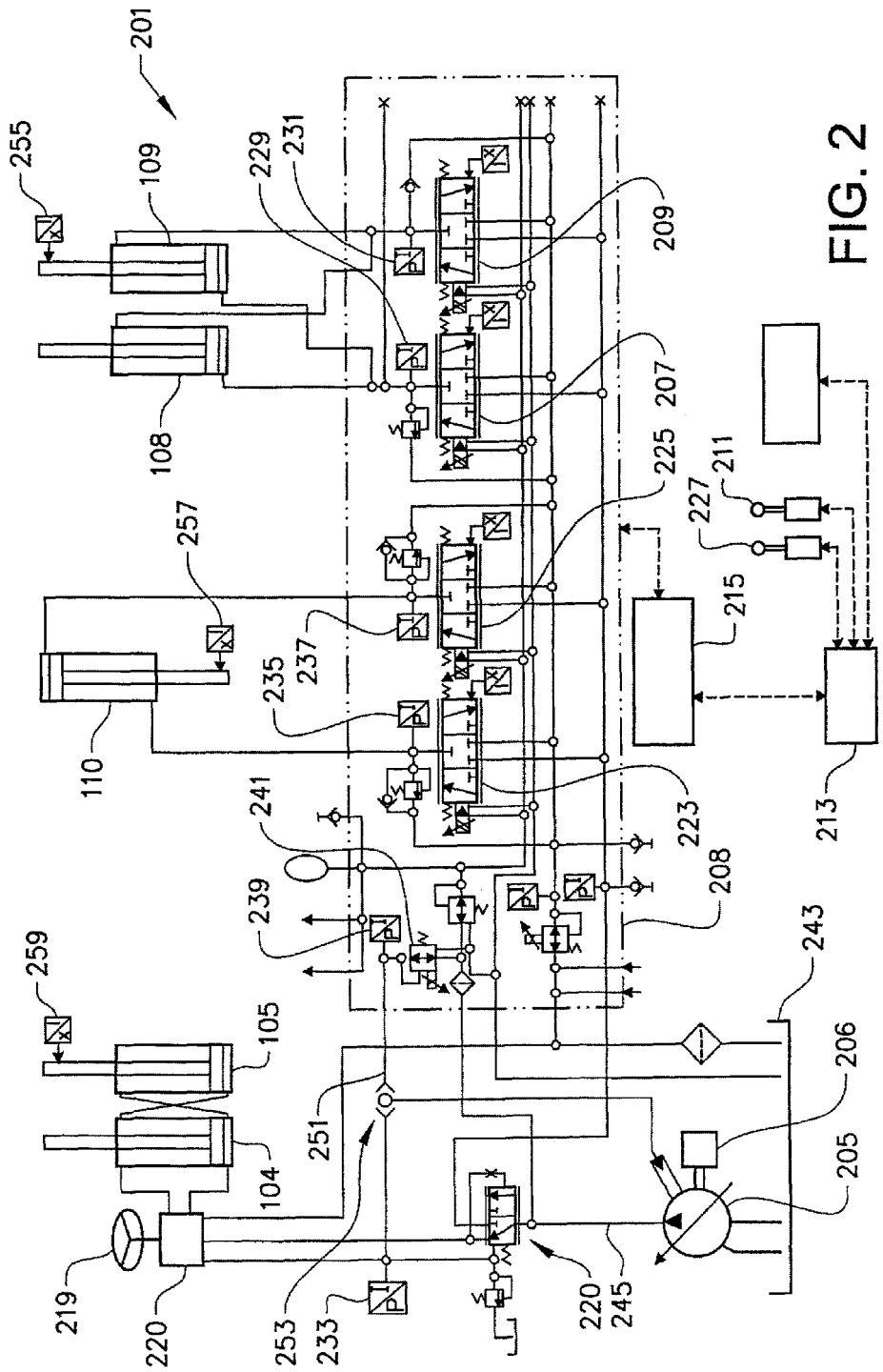
FIG. 2 shows an embodiment of a system for the wheel loader.

A first embodiment of the system is shown in FIG. 2. The system 201 comprises a pump 205 adapted to supply the hydraulic cylinders with pressurized hydraulic fluid via a hydraulic circuit. The pump 205 is driven by the vehicle's propulsion engine 206, in the form of a diesel engine. The pump 205 has a variable displacement. The pump 205 is preferably adapted for infinitely variable control. The system 201 comprises a valve device 208 (se the dash-dotted line) which comprises a hydraulic circuit having a plurality of control valves for controlling the lift and tilt function.

Two control valves, in the form of flow valves, 207, 209, are arranged between the pump 205 and the lift cylinders 108, 109 in the circuit for controlling the lifting and lowering movement. While a first one of these valves 207 is arranged to connect the pump 205 to the piston side, a second one of these valves 209 is arranged to connect a tank 243 to the piston rod side. Furthermore, the first valve 207 is arranged to connect the tank 243 to the piston side and, correspondingly, the second valve 208 is arranged to connect the pump 205 to the piston rod side. This offers large possibilities for varying the control. In particular, it is not necessary to connect the pump and tank simultaneously to the function.

The system 201 further comprises a control unit 213, or computer, which contains software for controlling the functions. The control unit is also called a CPU (central processing unit) or ECM (electronic control module). The control unit 213 suitably comprises a microprocessor.

An operator-controlled element 211, in the form of a lift lever, is operatively connected to the control unit 213. The control unit 213 is adapted to receive control signals from the control lever and to actuate the control valves 207, 209 correspondingly (via a valve control unit 215). The control unit 213 preferably controls more general control strategies and the control unit 215 controls basic functions of the valve unit 208. Naturally, the control units 213, 215 can also be integrated into a single unit. When controlling the pump 205, there is an oil flow out to the cylinders 108, 109, the level of which depends on the extent to which the activated valves 207, 209 are adjusted.

An operator-controlled element 219, in the form of a steering-wheel, is hydraulically connected to the steering cylinders 104, 105, via a valve unit in the form of an orbitrol unit 220, for direct-control thereof.

Similarly as for the lift function, two control valves 223, 225 are arranged between the pump 205 and the tilt cylinder 110 for controlling the forward and return movement of the implement relative to the load-arm unit. An operator-controlled element 227, in the form of tilt lever, is operatively connected to the control unit 213. The control unit 213 is adapted to receive control signals from the tilt lever and to actuate the control valves 223, 225 correspondingly.

A prioritizing valve 220 is arranged at the outlet conduit 245 of the pump for automatically prioritizing that the steering function receives the required pressure before the lift function (and tilt function).

The system 201 is load sensing and comprises, for this purpose, a plurality of pressure sensors 229, 231, 233, 235, 237 for detecting load pressures of each of said functions. The lift function of the system comprises two pressure sensors 229, 231, out of which one is arranged on a conduit to the piston side of the lift cylinders and the other on a conduit to the piston rod side of the lift cylinders. In a corresponding way, the tilt function of the system comprises two pressure sensors 235, 237, out of which one is arranged on a conduit to the piston rod side of the tilt cylinder and the other on a conduit to the piston side of the tilt cylinder. The steering function comprises a pressure sensor 233 on a conduit connected to the steering cylinders 104, 105. More precisely, the pressure sensor 233 is situated on the LS conduit which receives the same pressure as on one cylinder side when steering in one direction and as on the other cylinder side when steering in the other direction. In neutral, the LS conduit is connected to tank.

The system further comprises an electrically controlled valve 241 adapted to control the output pressure of the pump via a hydraulic signal. The system 201 comprises an additional pressure sensor 239 for detecting a pressure which is indicative of an output pressure from the pump. More precisely, the pressure sensor 239 is adapted to detect the pressure in a position downstream the electrically controlled valve 241. Accordingly, the pressure sensor 239 senses the pump pressure directly when the valve 241 is fully open. In normal operating conditions, the pressure sensor 239 detects the modulated pressure from the valve 241. Accordingly, the control unit 213 is adapted to receive a signal from the pump pressure sensor 239 with information about of the pressure level.

Accordingly, the control unit 213 receives electrical signals from the pressure sensors 229, 231, 233, 235, 237, 239 and generates an electrical signal for actuating the electrical valve 241.

As previously stated, the control unit 213 is adapted to receive signals from the control levers 211, 227. When the operator desires to lift the bucket, the lift lever 211 is operated. The control unit receives a corresponding signal from the lift lever 211 and actuates the control valves 207, 209 to such a position that the pump is connected to the piston side of the lift cylinders 108, 109 and the piston rod side of the lift cylinders is connected to the tank 243. Furthermore, the control unit receives signals from the load pressure sensor 229 on the piston side of the lift cylinders and from the pressure sensor 239 downstream the pump. Based upon the received signals, a desired pump pressure at a level above the detected load pressure is determined, and the electrically controlled pump control valve 241 is actuated correspondingly.

The control unit 213 is preferably adapted to coordinate the opening degree of the control valves 207, 209 and the output pressure of the pump 205 for optimum operation.

The tilt function is controlled in a corresponding manner as the lift function. When steering the machine, the pressure sensor 233 of the steering function detects a steering load pressure and generates a corresponding load signal. The control unit 213 receives this load signal and a signal from the pressure sensor 239 on the outlet conduit of the electrically controlled valve 241. Based upon the received signals, a desired pump pressure at a level above the detected load pressure is determined, and the electrically controlled pump control valve 241 is actuated correspondingly.

When several functions are used simultaneously, the detected load pressures are compared and the pump 205 is controlled corresponding to the highest one of the detected load pressures.

Accordingly, the electrically controlled pump control valve 241 is adapted to be infinitely adjustable between two end positions, a first end position which corresponds to the pump generating a minimum pressure and a second end position which corresponds to the pump generating a maximum pressure.

A hydraulic means 253, in the form of a reversing valve, is arranged on a conduit 251 between the electrically controlled pump control valve 241 and the pump. The reversing valve 253 is adapted to receive the hydraulic signals from the steering function and the pump control valve 241. Furthermore, the reversing valve is adapted to control the pump 205 corresponding to the received signal having the largest load pressure. Accordingly, the hydraulic means (reversing valve) 253 selects the higher pressure in an output signal made up of two input pressure signals.

The system further comprises a sensor 255 for detecting lift cylinder position. The sensor 255 is operatively connected to the control unit 213. In this way, the control unit 213 can decide whether a lifting or lowering movement of the load is performed.

Figure 3:
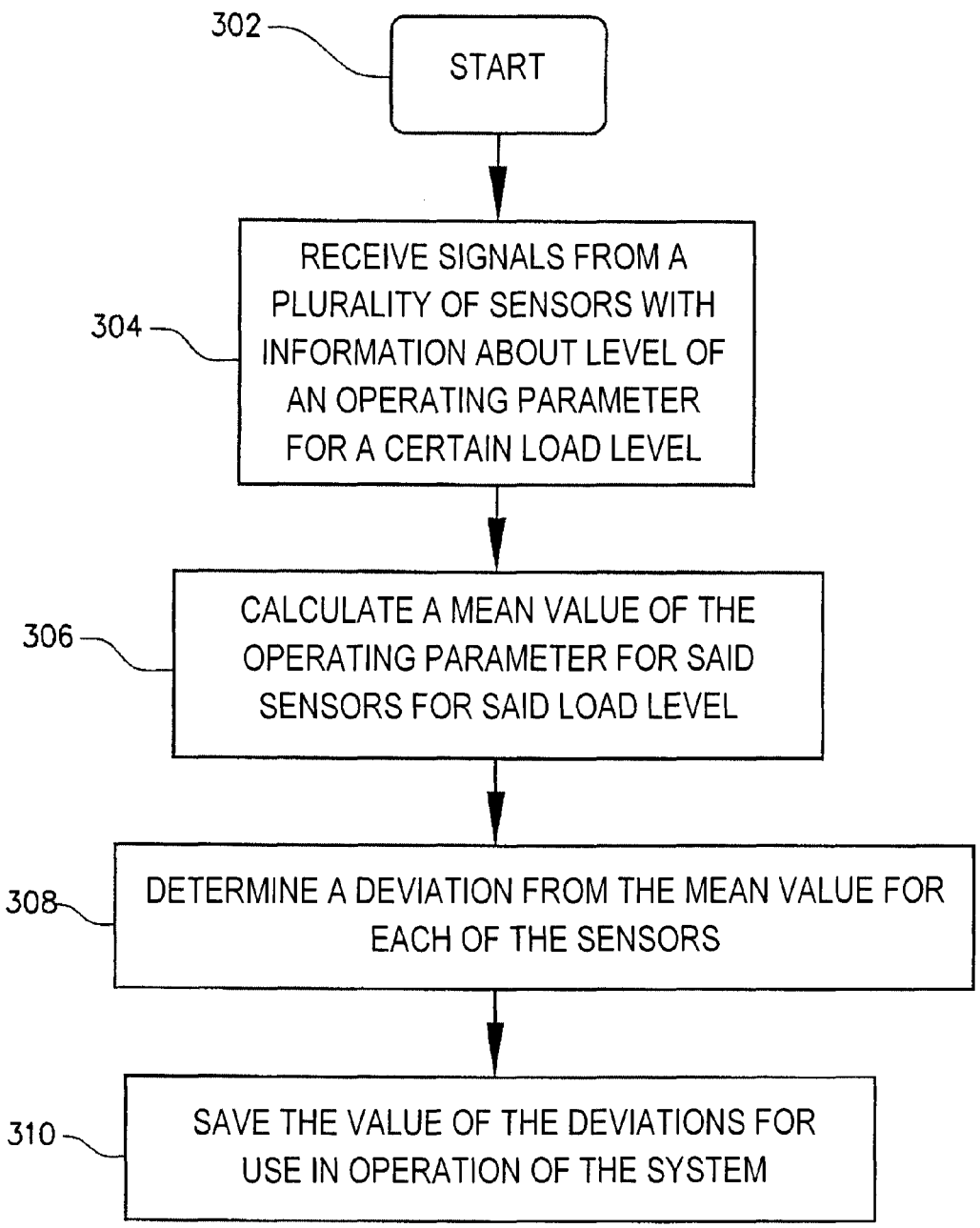
FIG. 3 shows a method for performing calibration of sensors in the system according to FIG. 2.

FIG. 3 shows an example of a method for calibrating sensors in a system comprising a plurality of sensors 229, 231, 233, 235, 237, 239, 261, 263, which are arranged so that they can be subjected to the same load. The sensors are preferably of the same type, that is to say, of substantially the same design or exactly the same article. The method is preferably performed on a larger number of sensors, preferably at least four of them. According to this example, the method is performed on the hydraulic system 201 described in the foregoing.

Since a first control valve 207; 225 is connected to a port on the piston side and a second control valve 209; 223 is connected to a port on the piston rod side of the hydraulic cylinder(s) 108, 109; 110 for lift and tilt, respectively, the pressure sensors 229, 231; 235, 237 can be pressurized without having any flow through any of the ports.

The method starts in the start box 302. The sensors detect the level of an operating parameter for a certain load level, preferably simultaneously and individually. The control unit 213 continues to the next box 304, where it receives signals from said sensors with information about the level of the operating parameter for said load level. In the next box 306, a mean value of the operating parameter is calculated for said sensors for said load level. In the next box 308, a deviation from the mean value is determined for each of the sensors. Accordingly, the deviation is determined as the difference between an absolute value for the sensor and the mean value. In the next box 310, the value of the deviations is saved for use in operation of the system. More precisely, this use in operation of the system means interpretation of a value detected in operation. Accordingly, when receiving an input signal from a sensor, the deviation is added to (or subtracted from) the input sensor value.

According to a preferred embodiment, the method comprises the step of loading the sensors at a first determined level. This is preferably done by pressurizing the system via the pump 205. The pump 205 is preferably stepped up to a determined pressure, suitably maximum pressure.

The calibration is preferably repeated automatically at least once during one use of the system. In particular, said steps are performed automatically during start-up of the system. According to an alternative or supplement, the method comprises the step of performing said steps based upon a start signal from an operator-controlled element associated with the calibration. In such a case, the calibration is started by the operator, and then it is suitable to step through several pressure levels if the system allows it.

According to another preferred embodiment, the method comprises the step of loading the sensors at a plurality of determined levels, saving the deviation values for each of the sensors for each of said load levels, and interpolating values for the deviation for the respective sensors within the range between said levels. Thus, according to the present example, sensor values are collected at several pressure levels. This is preferably done under the prerequisite that possible conflicts with brake pressure loading, parking brake, cooling fan, etc. are taken care of.

According to another preferred embodiment, the method comprises the step of determining whether the level of the detected operating parameter for each of the sensors is within an acceptable tolerance, and only using the level in the mean value determination if it is within the acceptable tolerance. Accordingly, when calculating the mean value, sensor values which deviate more than the tolerance (for example 3%) from the mean value are ignored. Preferably, an error message is generated for a specific sensor if the detected value is not within the acceptable tolerance.

According to another preferred embodiment, the method comprises the step of repeating said steps several times and determining the mean value for each load as an average of the mean values from said repeated times. In such a way, a high accuracy can be obtained. For example, the sensors are loaded sequentially (that is to say, several successive times) at a plurality of predetermined levels.

The foregoing description is directed towards pressure sensors in hydraulic systems, but could also be analogously applied to pressure sensors in other systems (air, water, etc), and also to temperature sensors, in systems with several sensors.

The invention should not be regarded as limited to the above-described exemplary embodiments, but a number of further variants and modifications are conceivable within the scope of the following claims. In particular, the preferred embodiments can be combined in a number of different ways.

The invention claimed is:

1. Method for calibrating sensors in a system comprising a plurality of sensors for detecting load pressures of different functions of the system, which sensors are arranged so that they can be subjected to the same load during calibration, comprising
    detecting a level of an operating parameter for a certain load level individually by at least two of the sensors,
    calculating a mean value of the operating parameter for the sensors for the load level,
    determining a deviation from the mean value for each of the sensors,
    saving a value of the deviations for use in operation of the system,
    loading the sensors at a plurality of determined levels,
    saving deviation values for each of the sensors for each of the load levels, and
    interpolating values for the deviation of the respective sensors within the range between the levels.

2. Method according to claim 1, comprising loading the sensors at a first determined level.

3. Method according to claim 2, wherein the system is adapted to be pressurized and the load constitutes a pressure.

4. Method according to claim 1, comprising determining whether the level of the detected operating parameter for each of the sensors is within an acceptable tolerance, and only using the level in the mean value determination if it is within the acceptable tolerance.

5. Method according to claim 1, comprising detecting the level of the operating parameter for a specific load level individually by means of at least four of the sensors.

6. Method according to claim 1, comprising determining the deviation as the difference between an absolute value for the sensor and the mean value.

7. Method according to claim 1, comprising repeating the operating parameter detection several times and determining the mean value for each load as an average of the mean values from the repeated times.

8. Method according to claim 7, comprising automatically repeating the steps at least once during one use of the system.

9. Method according to claim 1, comprising automatically performing the steps during start-up of the system.

10. Method according to claim 1, comprising performing the steps based upon a start signal from an operator-controlled element associated with the calibration.

11. Method according to claim 1, wherein the steps are performed at a maximum load.

12. Method according to claim 1, wherein the operating parameter constitutes a pressure.

13. Method according to claim 1, wherein the system constitutes a hydraulic system for a working machine and the operating parameter is associated therewith.

14. Method according to claim 13, comprising generating the determined load by means of stepping up a pump included in the hydraulic system to a determined pressure.

15. Method according to claim 1, wherein a first one of the sensors is adapted to detect a pressure of a first hydraulic cylinder.

16. Method according to claim 1, wherein the sensors are of the same type.

* * * * *